United States Patent
Gomyo et al.

(10) Patent No.: US 7,461,455 B2
(45) Date of Patent: Dec. 9, 2008

(54) METHOD FOR MANUFACTURING A FLUID DYNAMIC BEARING BY PRINTING A RESIN SLIDING FILM

(75) Inventors: Masato Gomyo, Nagano (JP); Shingo Suginobu, Nagano (JP); Nobutaka Nagao, Kanagawa (JP); Koichi Shoda, Kanagawa (JP); Akihito Kobayashi, Kanagawa (JP)

(73) Assignees: Nidec Sankyo Corporation, Nagano (JP); Toyo Drilube Co., Ltd., Tokyo (JP)

(*) Notice: Subject to any disclaimer, the term of this patent is extended or adjusted under 35 U.S.C. 154(b) by 263 days.

(21) Appl. No.: 11/282,517

(22) Filed: Nov. 18, 2005

(65) Prior Publication Data
US 2006/0070238 A1 Apr. 6, 2006

Related U.S. Application Data

(62) Division of application No. 10/621,032, filed on Jul. 16, 2003, now abandoned.

(30) Foreign Application Priority Data
Jul. 18, 2002 (JP) ............................. 2002-209152

(51) Int. Cl.
*B21D 53/10* (2006.01)
*F16C 32/06* (2006.01)

(52) U.S. Cl. .............. 29/898.02; 29/898.12; 29/898.13; 29/898.1; 29/898.11; 384/107

(58) Field of Classification Search .............. 29/898.12, 29/898.02, 898.13, 898.1, 898.11; 384/107, 384/112, 113, 114, 115, 123
See application file for complete search history.

(56) References Cited

U.S. PATENT DOCUMENTS

| 5,817,397 A * | 10/1998 | Kamiya et al. ............. 428/141 |
| 2002/0006472 A1 * | 1/2002 | Kazi et al. ................ 427/388.1 |

FOREIGN PATENT DOCUMENTS

| JP | 62-278313 | 3/1987 |
| JP | 7-310733 | 11/1995 |
| JP | 2001-289243 | 10/2001 |

* cited by examiner

*Primary Examiner*—David P Bryant
*Assistant Examiner*—Sarang Afzali
(74) *Attorney, Agent, or Firm*—Hogan & Hartson LLP (57) ABSTRACT

A bearing apparatus includes a rotating member, a fixed member opposing the rotating member and an ink-like resin material. Opposing surfaces of the rotating member and the fixed member form a bearing part and the ink-like resin material is applied to at least one of the opposing surfaces by transfer printing.

6 Claims, 13 Drawing Sheets

PRIOR ART

METHOD FOR MANUFACTURING A FLUID DYNAMIC BEARING BY PRINTING A RESIN SLIDING FILM

CROSS-REFERENCE TO RELATED APPLICATIONS

This is a divisional of application Ser. No. 10/621,032 filed Jul. 16, 2003, now abandoned, which application is hereby incorporated by reference in its entirety.

BACKGROUND OF THE INVENTION

1. Field of the Invention

The invention relates to a bearing apparatus in which a bearing part is formed by a mutually opposed rotating member and a fixed member, and to a method for manufacturing such a bearing apparatus.

2. Related Background Art

Bearings are widely used in various rotational drive apparatuses and the like. An example of such a bearing is a fluid dynamic bearing, in which a rotating member is supported by developing a dynamic pressure in a lubricating fluid. This bearing apparatus is provided with a thrust bearing part SB and a radial bearing part RB, as shown in FIG. 16 of the accompanying drawings.

Figure 16:
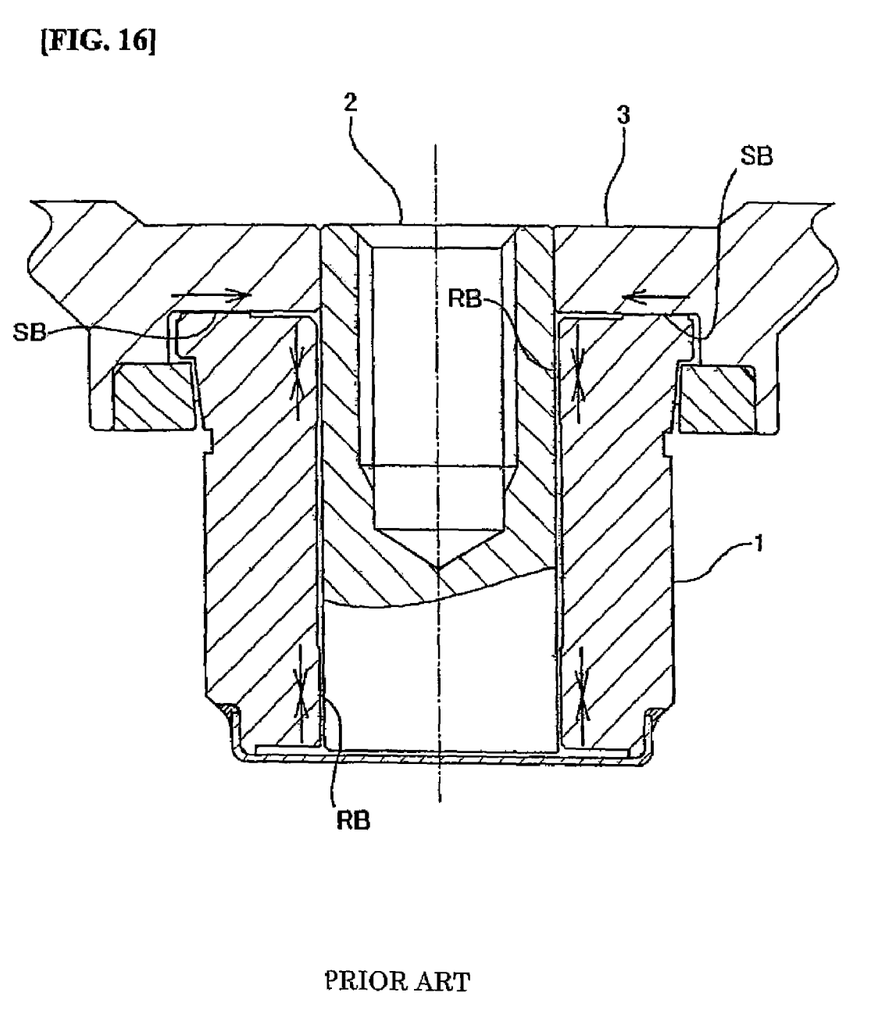
FIG. 16 is a vertical cross-sectional view providing an enlarged view of the construction of a fluid dynamic bearing of the past.

Referring to FIG. 16, a rotating member (rotating hub) 3 is joined to a rotating shaft 2, which is supported by a fluid dynamic bearing member (bearing sleeve) 1. The bearing sleeve 1 serves as a fixed member. The end face of the rotating member 3 in the axial direction near the central region thereof (lower side as shown in FIG. 16) and the axial-direction outer end face of the fluid dynamic bearing member 1 (upper side in FIG. 16) are mutually opposed, so as to form an opposing thrust bearing interface. This thrust bearing forms a fluid dynamic thrust bearing part SB.

An appropriate lubrication fluid (not shown in the drawing) is injected inside the bearing space in the fluid dynamic thrust bearing part SB, and a spiral dynamic pressure generating groove is formed in the circumferential direction as a means for generating dynamic pressure in the lubricating fluid. The dynamic pressure-generating groove generates a dynamic pressure relative to the above-noted lubrication fluid by pressurizing action acting in the direction of the arrow, thereby achieving the desired thrust floating force.

In the radial bearing interface at which the inner peripheral wall surface of the fluid dynamic bearing member 1 and the outer peripheral wall surface of the rotating member 2 are in mutual opposition, radial bearing parts RB are formed at two locations along the axial direction. On the inside of each of the fluid dynamic radial bearing parts SB is injected a lubrication fluid (not shown in the drawing), which is continuous with the lubrication fluid of the fluid dynamic thrust bearing part SB. Herringbone shaped dynamic pressure-generating grooves, for example, are formed in a row in the circumferential direction as a means of generating dynamic pressure in the lubrication fluid. The dynamic pressure-generating grooves generate a dynamic pressure in the lubrication fluid by a pressurizing action in the direction of the arrow, thereby achieving the desired radial floating force.

In order to reduce the coefficient of friction between the opposing surfaces in the of bearing interface formed by the rotating member 2 and the fixed member 1 of the bearing apparatus described above, a coating or the like of a resin sliding film is applied thereto. The resin material forming the resin sliding film is, for example, a polyamide-based or epoxy-based material, and particles of a solid lubricant such as PTFE, molybdenum disulfide, or graphite or the like are often further disbursed in the resin material. Methods of forming the resin slide material generally include electrodeposition, immersion, the pulling method, painting, spraying, and printing.

None of these methods forming the resin sliding film in the past were capable of forming the resin sliding film with a high degree of accuracy and low cost.

In the case of immersion, for example, there is a large variation in the thickness of the film that is formed, thereby requiring subsequent processing to achieve film thickness accuracy. In addition, it is necessary to use a process step of forming a mask at locations not requiring the film, as well as a process step of removing this mask, thereby inevitably resulting in an expensive manufacturing process.

In the case of using electrodeposition, although it is relatively easy to control the film thickness, the limit to the variation in film thickness is ±5 μm to ±10 μm, thereby limiting the accuracy that can be achieved. Additionally, as in the case of the immersion method, it is necessary to use a process step of forming a mask at locations not requiring the film, and a process step of removing the mask, thereby resulting in an expensive manufacturing process.

With the spray method as well, there is a large variation in the thickness of the film that is formed, thereby requiring subsequent processing to achieve film thickness accuracy, as well as the need to use a process step of forming a mask at locations not requiring the film, and a process step of removing the mask, thereby inevitably resulting in an expensive manufacturing process.

Using the painting method, because a dispenser or the like is used to paint onto prescribed locations, there is no need to form a mask or the like. However, there is a large variation in the thickness of the film that is formed. Additionally, a spinner capable of improving the film thickness accuracy is not usable with a large, complex surface area that is not flat, such as in a bearing apparatus. Even if such a spinner were to be used, an additional step is required to remove resin that is splattered by a centrifugal force, thereby making the manufacturing process expensive.

In all of the above-noted methods, because there is a large amount of material wasted, there is a limitation imposed on the improvement of productivity. In the down-stream processing made necessary by an increase in the variation in the thickness of the resin sliding film that is formed, a cutting burr can remain at locations from which excess resin has been removed, and the peeling away of this burr, which can then float, can cause problems with rotation.

In the case of using the method of printing, screen printing is usually employed. With screen printing, however, it is only possible to print on a flat or cylindrical surface that can be brought into intimate contact with the screen. There is thus the problem of not being able to apply screen printing to surfaces having complex shapes, as in bearing apparatuses. For example, in a conventional fluid dynamic bearing under the premise that it is difficult to directly coat a resin slide film onto a surface of a thrust bearing part, a thin metal sheet is precoated with resin and then adhered to the main unit. In this case, however, it is clear that the cost of both parts and labor is high.

Given the above situation, the present invention provides a bearing apparatus in which it is possible to simply and efficiently form a resin sliding film on the opposing surfaces forming a bearing part.

SUMMARY OF THE INVENTION

In order to solve the problems described above, in a first aspect of the present invention at least one of the opposing surfaces of a rotating member and a fixed member is provided with an ink-like resin material applied by transfer printing.

In essence, in the bearing apparatus of the first aspect of the present invention, by transfer printing of an ink-like resin material it is extremely easy to form a resin sliding film on even a bearing part having a complex shape, and to achieve a high degree of accuracy in the thickness of the resin sliding film.

By adopting the constitution described above, the first aspect of the present invention provides a superior effect, in that it enables the achievement of a bearing apparatus with a highly reliable resin sliding film.

A bearing apparatus of a second aspect of the present invention is a variation on the bearing apparatus of the first aspect, in which thrust fluid dynamic surfaces are formed on both opposing surfaces of the rotating member and the fixed member, so as to form a fluid dynamic thrust bearing part. In this bearing apparatus, at least one of the thrust fluid dynamic surfaces is provided a resin sliding film, this resin sliding film forms a thrust dynamic pressure-generating groove.

In a bearing apparatus of the second aspect of the present invention configured as noted above, in addition to ease and simplicity in forming a highly accurate resin sliding film on the thrust fluid dynamic surface, there is efficient formation of a thrust fluid dynamic pressure-generating groove.

By adopting the constitution described above, the second aspect of the present invention provides the effect of the first aspect, and additionally provides a great improvement in the efficiency of forming the thrust fluid dynamic pressure-generating groove.

A third aspect of a bearing apparatus according to the present invention is a variation on the second aspect, wherein the rotating member is a rotating body having an annular wall surface erected coaxially relative to the axis of rotation of the rotating member, and a planar disk-shaped part formed so as to be surrounded in the inner radial direction by the annular wall surface. In this bearing apparatus, the planar disk-shaped part of the rotating member is provided with a resin sliding film so as to form a thrust bearing part.

In a bearing apparatus configured as noted above, a resin sliding film is easily and efficiently formed on the thrust fluid dynamic surface on the inside of the thrust bearing part.

By adopting the constitution described above, the third aspect of the present invention is particularly advantageous in that it facilitates and improves the accuracy of forming a resin sliding film on the thrust fluid dynamic surfaces of a thrust bearing part having a complex shape, thereby achieving a superior effect with respect to a thrust bearing part.

A fourth aspect of the present invention is a method for manufacturing a bearing apparatus, wherein transfer-printing of a resin sliding film is performed onto at least one of the opposing surfaces of a rotating member and a fixed member by pressing thereagainst a soft pad member onto which an ink-like resin material has become affixed thereonto.

In essence, in the method of manufacturing a bearing apparatus of the fourth aspect, by performing transfer printing of an ink-like resin material using a soft pad, it is not only extremely easy to form a resin sliding film on even a bearing part with a complex shape, but also possible to achieve a high degree of accuracy in the thickness of the resin sliding film thereby formed.

By adopting the constitution described above, the fourth aspect of the present invention provides not only the achievement of a highly accurate resin sliding film thickness, but also a further improvement in the above-described effects.

A method of manufacturing a bearing part according to the fifth aspect of the present invention is a variation of the fourth aspect. In this method, thrust fluid dynamic surfaces are formed on both opposing surfaces of the rotating member and the fixed member, so as to form a fluid dynamic thrust bearing part. The above-noted resin sliding film is provided on at least one of the thrust fluid dynamic surfaces, this resin sliding film forming a thrust dynamic pressure-generating groove. This manufacturing method includes a plate preparation step of forming a depression part in a plate member corresponding to the thrust fluid dynamic surface onto which the resin sliding film is to be formed, causing an ink-like resin material to flow into the depression part of the plate member, and then removing unwanted ink-like resin material from the surface of the plate member.

A primary transfer-printing step is provided for pressing a soft pad up against the plate member resulting from the plate preparation step, so as to cause the ink-like resin material within the depression part of the plate member to become affixed to the soft pad.

A secondary transfer-printing step is provided for pressing the soft pad onto which the ink-like resin material has been affixed by the primary transfer-printing step up against at least one of the opposing thrust fluid dynamic surfaces of a rotating member and a fixed member, so that the ink-like resin material on the soft pad member side is transferred to that thrust fluid dynamic surface side.

According to the method for manufacturing a bearing apparatus configured as noted above, by using a soft pad member on the thrust fluid dynamic surface, a resin sliding film is formed thereon with good efficiency and high accuracy.

By adopting the constitution described above, the fifth aspect of the present invention is particularly advantageous in being able to easily and with a high degree of accuracy form a resin sliding film on the thrust fluid dynamic surfaces of a thrust bearing part having a complex shape, thereby enabling achievement of the above-noted effects to a good degree.

DETAILED DESCRIPTION OF THE PREFERRED EMBODIMENTS

Embodiments of the present invention are described below in detail, with references made to relevant accompanying drawings. First, a hard-disk drive will be generally described, as an example of the application of a bearing apparatus according to the present invention.

Figure 1:
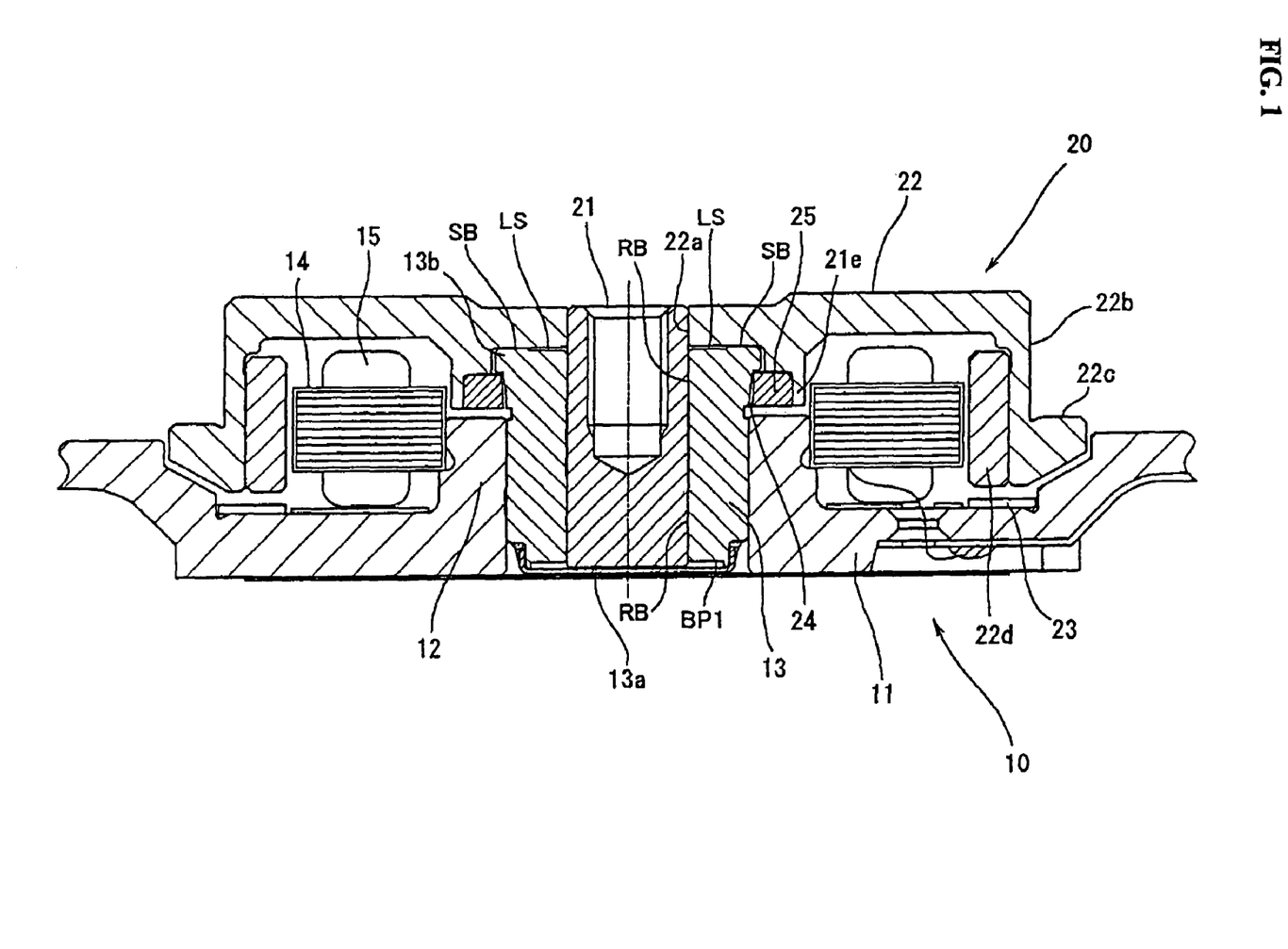
FIG. 1 is a vertical cross-sectional view providing a general view of a spindle motor for spindle-type hard-disk drive having a fluid dynamic bearing to which the present invention is applied.
Figure 2:
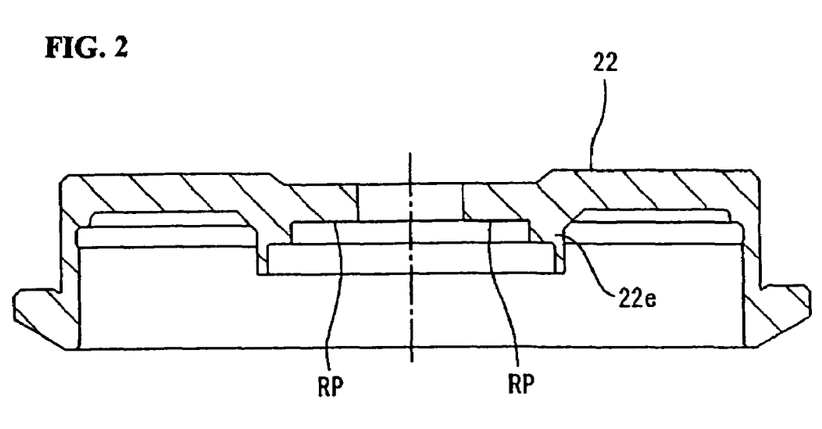
FIG. 2 is a vertical cross-sectional view providing an enlarged view of a rotating hub used as the rotating member in the hard-disk drive spindle motor shown in FIG. 1.

The overall spindle-type hard-disk drive apparatus shown in FIG. 1 is made up of a stator assembly 10 as the fixed member, and a rotor assembly 20 as the rotating member, which is assembled to the stator 10 from the top as seen in the drawing. Of these elements, the stator assembly 10 has a mounting frame 11, which is held to a mounting base (not shown in the drawing) by screws. The mounting frame 11 is formed from an aluminum alloy in order to achieve lightness. A bearing sleeve 13 is formed as a hollow cylindrical fluid dynamic bearing part on an inner peripheral surface of an annular bearing holder 12 formed at substantially the center of the mounting frame 11. The bearing sleeve 13 is either press fit or thermally shrunk fit so as to join it with the above-noted bearing holder 12. The bearing sleeve 13 is made of a copper-based material such as phosphor bronze or the like, to facilitate the forming of small-diameter holes therein.

Around the outer circumferential mounting surface of the bearing holder 12 is fitted a stator core 14 formed as a laminate of ferromagnetic sheets. Drive coils 15 are wound around each of the salient poles provided on the stator core 14.

A rotational shaft 21 is rotatably inserted at the central hole provided in the bearing sleeve 13 serving as the fixed fluid dynamic bearing member. The rotational shaft 21, forms the above-noted rotor assembly 20. That is, the fluid dynamic surface formed on the inner peripheral wall of the bearing sleeve 13 is disposed so as to oppose in the radial direction the fluid dynamic surface formed on the outer peripheral of the rotational shaft 21. In the tiny bearing gap formed therebetween are formed radial fluid dynamic bearing parts. RB at two locations mutually separated by an appropriate interval. More specifically, in the radial fluid dynamic bearing, the fluid dynamic surface on the bearing sleeve 13 side and the fluid dynamic surface on the rotational shaft 21 side are disposed in radial opposition, with a spacing of several μm therebetween. An intervening lubricating fluid such as lubricating oil or the like is injected into the tiny bearing interface space so as to be continuous in the axial direction.

Additionally, at least one of the fluid dynamic surfaces of the bearing sleeve 13 and the rotational shaft 21 has formed in it in two blocks a radial fluid dynamic pressure-generating groove in, for example, a herringbone shape. When rotating, the pumping action of this radial fluid dynamic pressure-generating groove generates a fluid dynamic pressure by applying pressure to the lubricating fluid. The fluid dynamic pressure of the lubricating fluid causes the support of the rotating member 21 and the rotating hub 22, to be described later, in the non-contacting condition in the radial direction with respect to the bearing sleeve 13.

The rotating hub 22, which is a rotating member serving, along with the rotational shaft 21, as a part of the rotor assembly 20, is formed by a substantially cap-shaped member made of a ferrite-based stainless steel. A joining hole 22a provided at the central part of the rotating hub 22 is joined, using a pressure fit or the like, with the upper part of the rotational shaft 21 illustrated in the drawing. This rotating hub 22 has a substantially cylindrically shaped middle section 22b, onto which rests the recording medium disk (not shown in the drawing), which is a magnetic recording disk or the like. The rotating hub 22 also has a disk placement part 22c, which extends outward in the radial direction from the middle section, 22b, and which supports the recording medium disk in the axial direction. The recording medium disk is fixed to the disk placement part 22c by pressure from above as shown in the drawing, provided by a clamper (not shown in the drawing) that is held in place by a screw.

An annular drive magnet 22d is mounted on the inner peripheral surface of the middle section 22b of the rotating hub 21. The inner peripheral surface of the drive magnet 22d is brought into proximity with the outer peripheral surfaces of each of the salient poles on the stator core 14, so as to be annularly opposing thereto. The lower end face of the annular drive magnet 22d is positioned opposite, in the axial direction, the magnetic pull-in plate 23 mounting to the holding frame 11 side. By magnetic attraction between the members 22d, 23, and the like, the overall rotating hub 22 is pulled in the axial direction, thereby achieving a stable rotating condition.

Additionally, an aperture provided at the lower side of the bearing sleeve 13 as shown in the drawing is covered over by a cover 13a. The cover 13a prevents the lubricating fluid within the radial fluid dynamic bearing part RB from leaking to the outside.

The upper end face of bearing sleeve 13 and lower end face at the center part of the rotating hub 22 as shown in the drawing are disposed so as to be in proximity and mutual opposition in the axial direction (up/down in the drawing). A bearing space that is continuous with the above-noted radial bearing part RB is formed within the thrust bearing interface LS in the space between the bearing space between the upper end face of the bearing sleeve 13 and the lower end face of the rotating hub 22. A thrust bearing part SB is provided in the bearing space that is continuous with this thrust bearing part RB.

Figure 3:
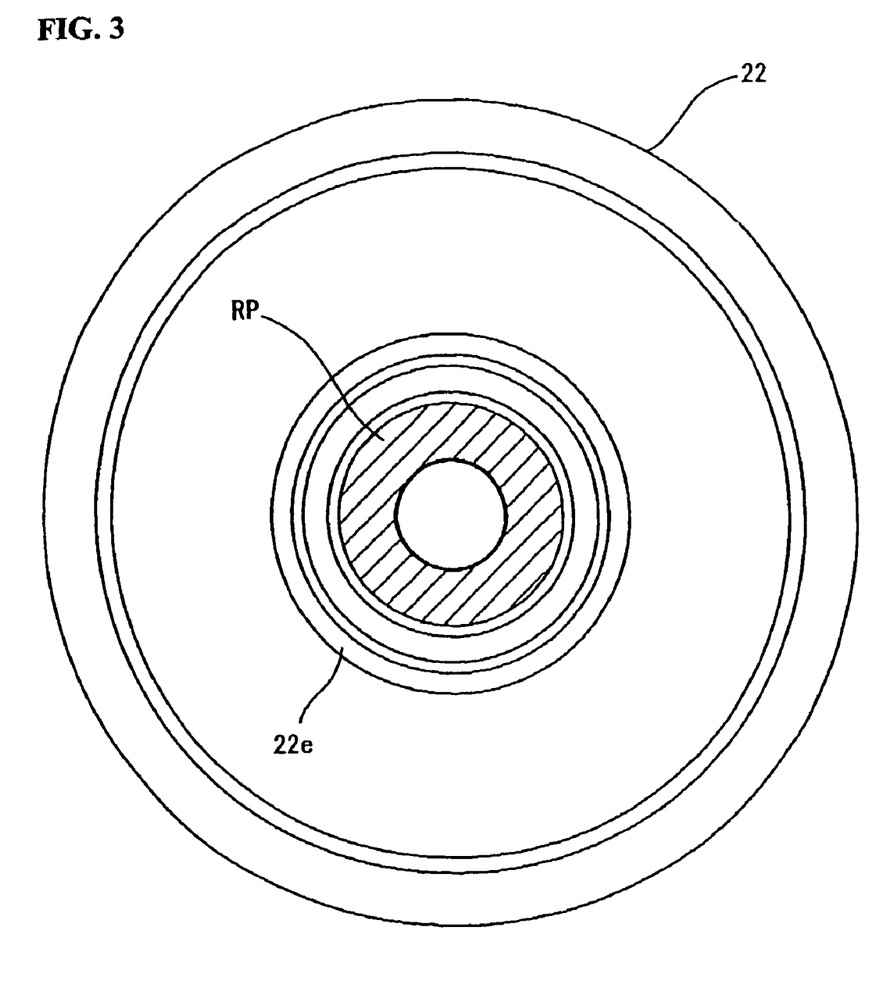
FIG. 3 is a drawing showing the configuration of the base surface side (bottom surface side) of the rotating hub shown in FIG. 2.

More specifically, in the opposing thrust fluid dynamic surfaces forming the above-noted thrust bearing interface LS, the rotating hub 22 has formed on it an annular wall surface part 22e that is erected coaxially with the center of rotation. A planar disk-shaped part is formed so as to be surrounded in the inner radial direction by the annular wall surface 22e. A thrust bearing interface fluid dynamic surface is formed on the planar disk-shaped part at the center. To improve the wear resistance and reduce the coefficient of friction of this thrust bearing interface fluid dynamic surface, a resin sliding film RP is applied and formed, as shown in FIG. 1 and FIG. 3. The method of forming resin sliding film RP is described later herein.

A spiral-shaped or herringbone-shaped thrust fluid dynamic pressure-generating groove is formed in the thrust bearing interface fluid dynamic surface on the bearing sleeve 13 side. The axial-direction opposing parts, which include the thrust fluid dynamic pressure-generating groove on the bearing sleeve 13 side and the opposing fluid dynamic surface on the rotating hub 22 side, form the thrust fluid dynamic bearing part SB.

The bearing sleeve 13 side thrust bearing fluid dynamic surface and the thrust bearing fluid dynamic surface on the rotating hub 22 side in proximity thereto, which form the above-noted thrust fluid dynamic bearing part SB are disposed in mutual opposition, with a tiny gap of several μm therebetween. The bearing space formed by this tiny gap is filled with a lubricating fluid such as oil or the like, which is continuous with the radial fluid dynamic bearing part RB. The pumping action of the thrust fluid dynamic pressure-generating groove applies pressure to the lubricating fluid so as to generate a fluid dynamic pressure in the lubricating fluid. The result is that the rotational shaft 21 and the rotating hub 22 float in the thrust direction and are supported in a non-contact condition.

The thrust fluid dynamic bearing part SB in this embodiment is disposed at the most outer peripheral part in the thrust bearing interface LS between the bearing sleeve 13 and the rotating hub 22. At the outer periphery of this thrust bearing interface LS, the lubricating fluid that exists overall within the thrust bearing interface LS including the thrust fluid dynamic bearing part SB, also uses the pumping action applying pressure in the radial direction inward.

Additionally, the outermost peripheral surface of the bearing sleeve 13 serving as the above-noted fixed fluid dynamic bearing member is a fluid seal formed by a capillary seal part 24. In essence, the capillary seal 24 acts as a fluid seal and is provided so as to be continuous in the radial direction relative to the thrust bearing interface in the axial direction, including the thrust fluid dynamic bearing part SB. The outer peripheral surface of the bearing sleeve 13 and the inner peripheral surface of a counterplate 25 serve as a retaining member formed so as to oppose the outer peripheral surface of the bearing sleeve 13 in the radial direction form the capillary seal 24. The counterplate 25 is formed by a ring-shaped member that is held to the flange part 22e provided on the rotating hub 22. The gap between the inner peripheral surface of the counterplate 25 and the outer peripheral surface of the bearing sleeve 13 expands continuously toward the aperture on the bottom as shown in the drawing, thereby forming a tapered seal space. The lubricating fluid within the thrust fluid dynamic bearing part SB is filled continuously until it reaches the capillary seal 24.

Under this condition, a retaining jaw part 13b is provided so as to protrude in the outward radial direction at the upper part of the bearing sleeve 13 as shown in the drawing. Part of this retaining jaw part 13b is disposed so as to be opposed to part of the counterplate 25 in the axial direction. The elements 13b and 25 serve to prevent the rotating hub 22 from being pulled off in the axial direction.

Onto the thrust bearing fluid dynamic surface on the rotating hub 22 side, which forms the thrust interface LS, is applied and formed a resin sliding film RP for the purpose of improving the wear resistance and reducing the coefficient of friction of the thrust fluid dynamic bearing part SB. The resin material used as the resin sliding film is, for example, an amidoimide resin or imid resin, or an epoxy-based resin or the like, which can tolerate long-term contact with ester-based oils such as used as the lubricating fluid without deteriorating. Particles of a solid lubricant such as PTFE, molybdenum disulfide, or graphite or the like are disbursed in this resin material.

A pad printing method using an ink-like resin material is used to form the resin sliding film RP. This method is described below. This pad printing method is used to perform transfer printing of the resin sliding film.

Figure 4:
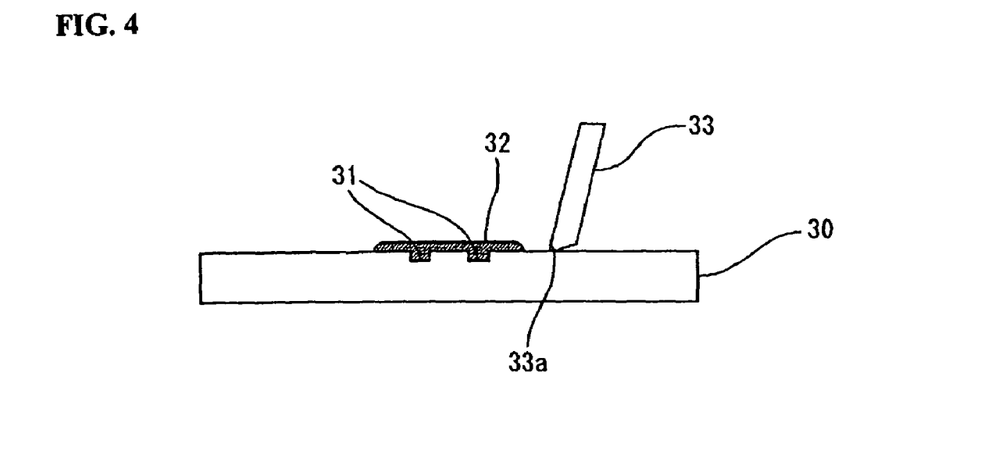
FIG. 4 is a side view providing a conceptual view of a manufacturing apparatus that includes a plate member for the purpose of forming a resin sliding film.
Figure 5:
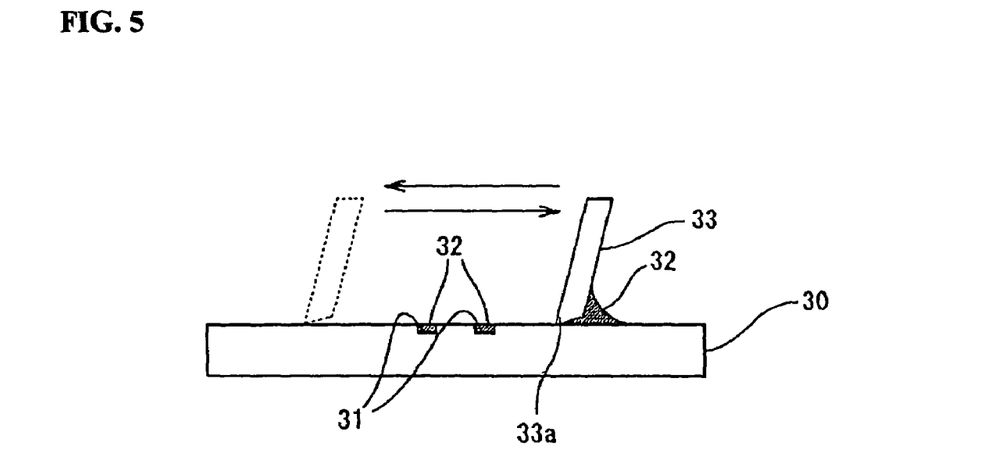
FIG. 5 is a side view showing a process step of removing an ink-like resin material from the plate member shown in FIG. 4.

First, a plate is prepared, as shown in FIG. 4 and FIG. 5. In this plate preparation step, an annular depression part 31 is formed by etching or the like in the plate member 30, so as to correspond to the thrust bearing fluid dynamic surface on the rotating hub 22 side. The ink-like resin material 32 is caused to flow into these depression part 31 so that it overflows somewhat. The ink-like resin material 32 is formed by dissolving a resin material that forms the resin sliding film into DFL or acetone or the like, and appropriately adjusting the viscosity to enable printing. The depth of the above-noted depression parts 31 is optimized for the viscosity of the ink-like resin material 32 and the thickness of the resin sliding film to be formed. Normally, this thickness is approximately two times the target film thickness of the resin sliding film RP (10 μm to 20 μm).

An edge part 33a of a squeegee 33 for ink removal is disposed in intimate contact with the surface of the plate member 30. The ink-removal squeegee 33 moves reciprocally in the directions indicated by the arrows in FIG. 5, thereby removing from the surface of the plate member 30 excess ink-like resin material overflowing from the depression parts 31. The ink-like resin material 32, therefore, remains only inside the depression parts 31 of the plate member 30.

Figure 6:
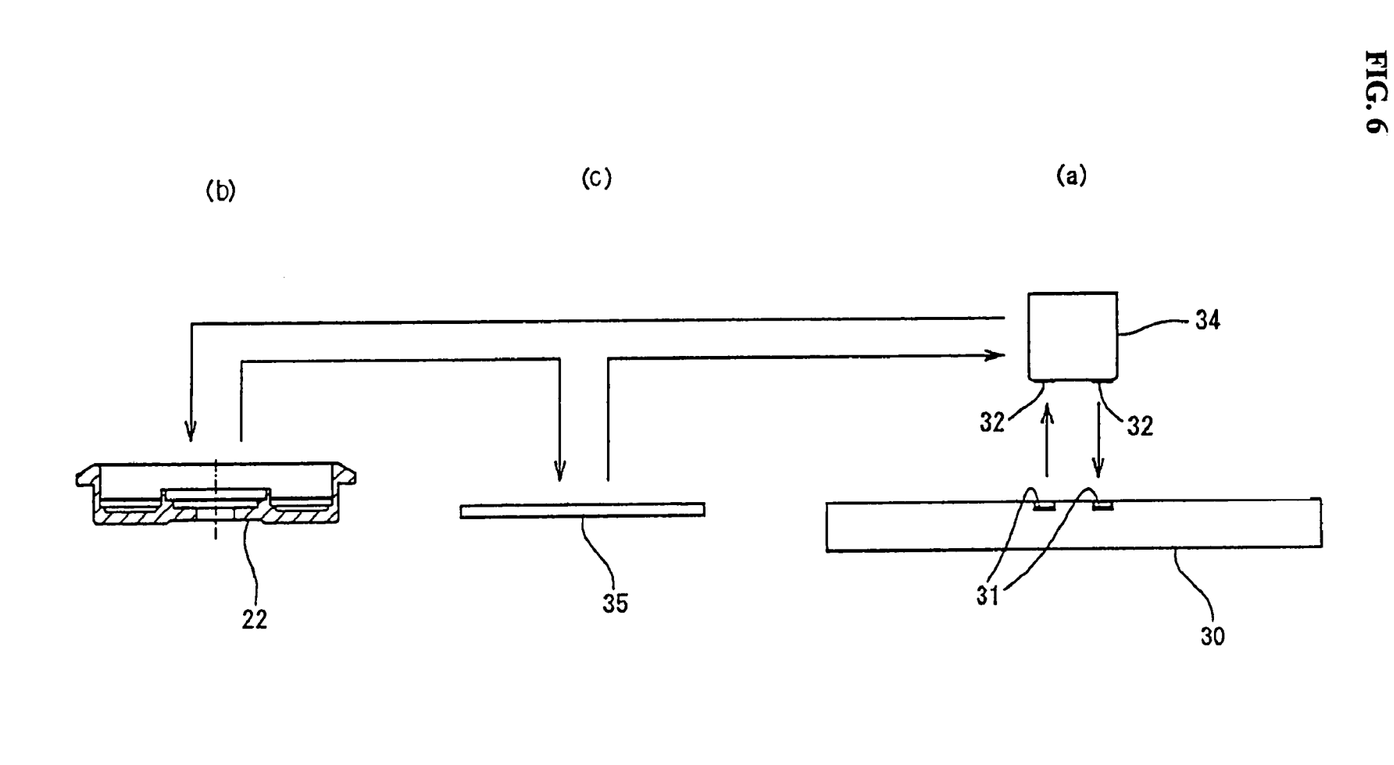
FIG. 6 is a side view providing a conceptual view of a process step for performing transfer printing of a resin sliding film using a soft pad member on the plate member shown in FIG. 4.

As shown in FIG. 6(a), a soft pad 34, formed from a resilient silicone rubber or the like is pressed against the plate member 30 that has been processed by the plate preparation step, so that the ink-like resin material 32 within the depression part 31 is transferred thereto by a primary transfer step. By this step, the ink-like resin material 32 that had been attached to the soft pad 34 forms a pattern corresponding to the ring-shaped pattern of the depression 31.

Figure 7:
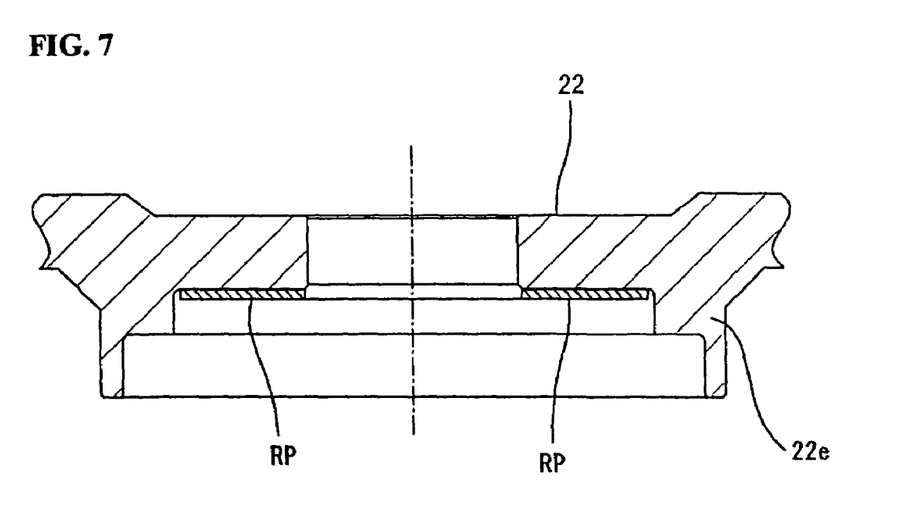
FIG. 7 is a vertical cross-sectional view providing an enlarged view of the condition in which a resin sliding film is transfer-printed onto a rotating hub.

The soft pad 34, onto which is attached the ink-like resin material 32 in a ring-shaped pattern, is lifted upward and away from the surface of the plate member 30, as shown in FIG. 6(b), so that it is positioned directly above the workpiece, which is the rotating hub 22 thrust bearing fluid dynamic surface. At that position, the soft pad 34 is lowered so as to be pressed against the thrust bearing fluid dynamic surface of the rotating hub 22. The pressure applied at that time performs a secondary transfer printing step, in which the ink-like resin material 32 attached to the soft pad 34 is transferred to the rotating hub 22 thrust bearing fluid dynamic surface. By this secondary transfer printing step, a resin sliding film RP is applied to and formed as shown in FIG. 7.

After the completion of the secondary transfer step for the resin sliding film RP, the soft pad 34 is transported so that, as shown in FIG. 6(c), it makes contact with an ink-removal member 35, which is formed by an adhesive tape, a non-woven cloth, or a sponge member. The ink-like resin material that had remained on the soft pad 34 is cleaned from the soft pad 34 by moving it toward the ink-removal member 35. After cleaning, the soft pad 34 is once again returned directly above the plate member 30, after which the same process steps are repeated.

Using the soft pad 34 in this manner to perform transfer printing of the ink-like resin material 32 onto the thrust bearing fluid dynamic surface, it is extremely easy to form a resin sliding film RP, even on a thrust fluid dynamic bearing part SB having a complex shape, and it is further possible to achieve a high degree of accuracy in the thickness of the resin sliding film RP thus formed.

Figure 8:
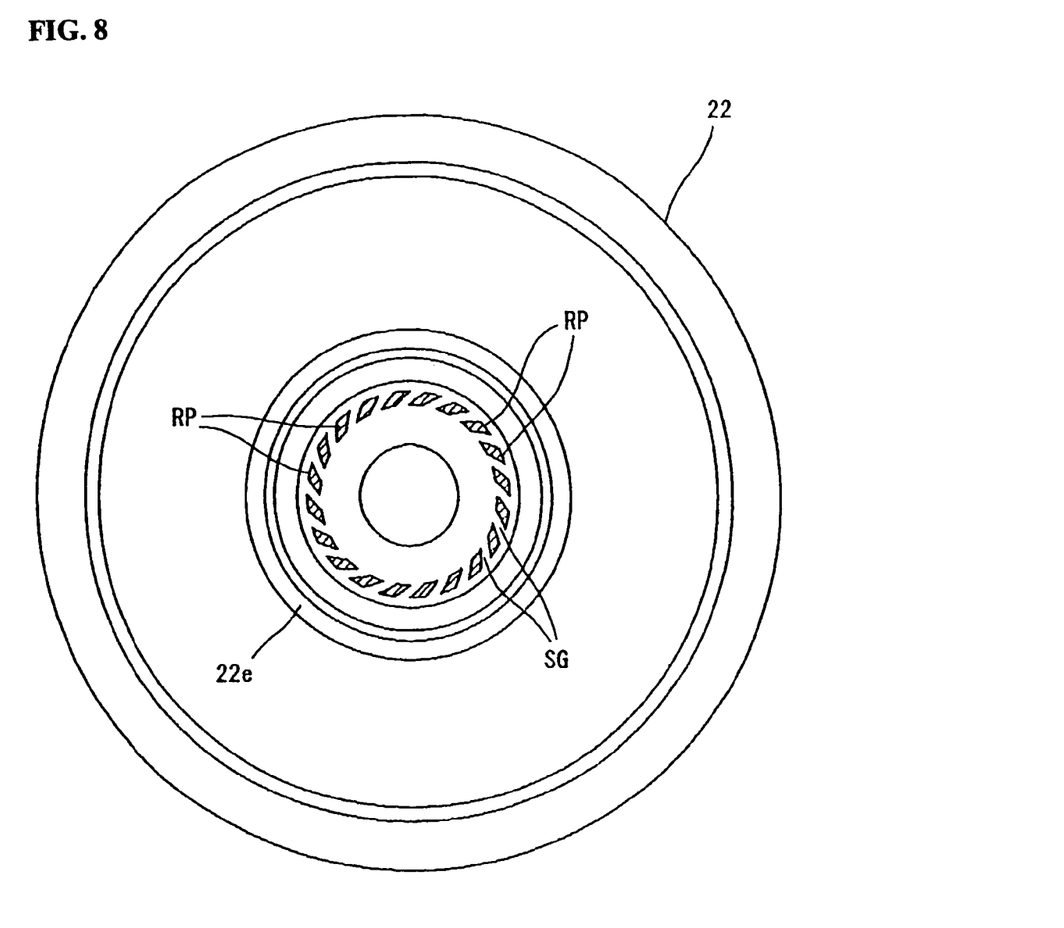
FIG. 8 is a drawing showing the configuration of the base surface side (bottom surface side) of the rotating hub in another aspect of the present invention.
Figure 9:
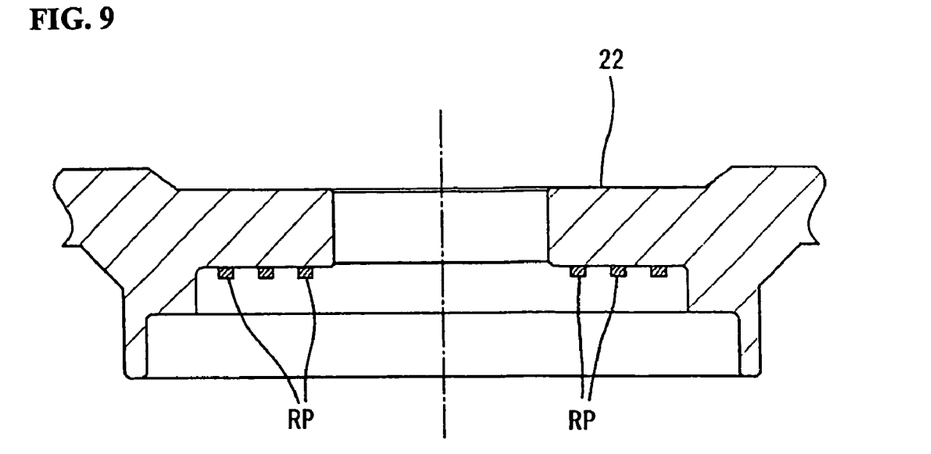
FIG. 9 is a vertical cross-sectional view providing an enlarged view of the rotating hub shown in FIG. 8.

In an embodiment shown in FIG. 8 and FIG. 9, the resin sliding, film RP is formed so that the thrust bearing fluid dynamic surface of the rotating hub 22 has a spiral-shaped fluid dynamic pressure-generating groove. A thrust fluid dynamic pressure-generating groove SG is formed as a depression at a location at which the resin sliding film RP is not formed. In this case, the thrust bearing fluid dynamic surface of the rotating hub 22 and the opposing thrust bearing fluid dynamic surface of the bearing sleeve 12 are formed so as to be planar.

The resin sliding film RP having a fluid dynamic pressure-generating groove pattern shape as described above can also be formed by the pad printing method of the first embodiment. However, because the thickness of the resin sliding film RP is the depth of the thrust fluid dynamic pressure-generating groove SG, the thickness of the resin sliding film RP in this embodiment is formed with highly precise control, for example, to within ±1 μm.

Figure 10:
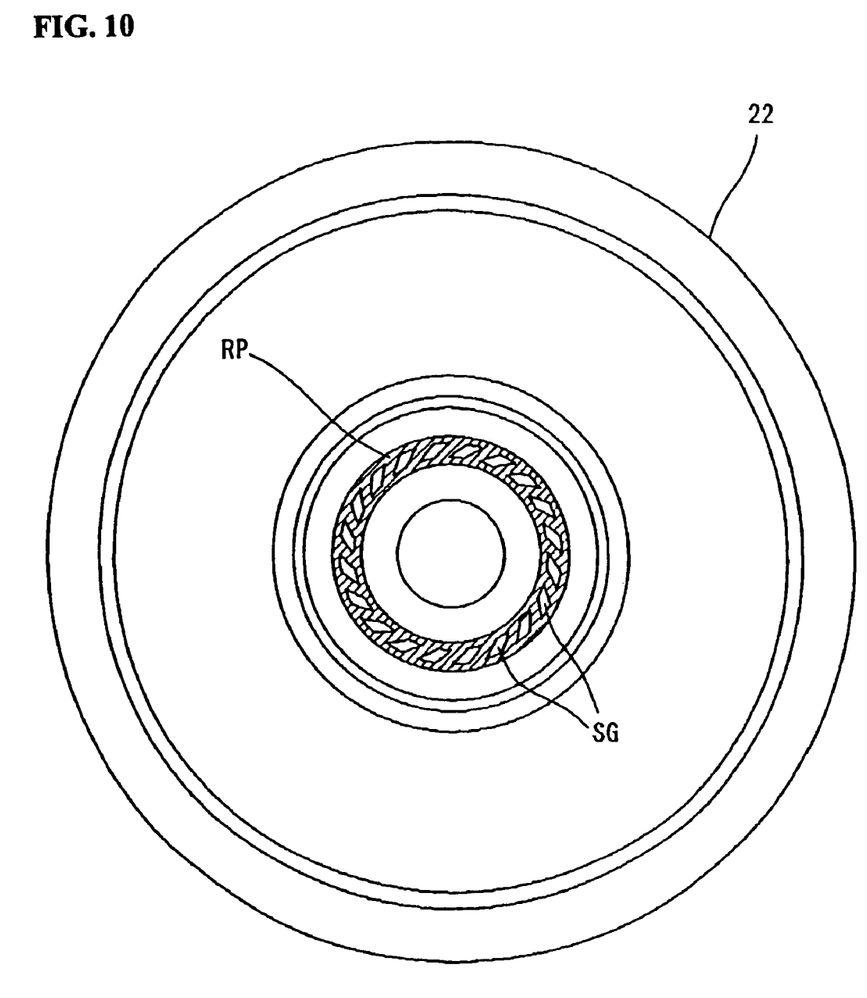
FIG. 10 is a drawing showing the configuration the base surface side (bottom surface side) of the rotating hub in yet another aspect of the present invention.

The embodiment shown in FIG. 10 is one in which the male-female surface shape relationship is reversed from that of embodiment shown in FIG. 8 and FIG. 9. By removing part of the resin sliding film RP, a spiral-shaped thrust fluid dynamic pressure-generating groove SG is formed as a depression. By doing this, it is possible to expand the amount of surface area over which there is an intimate contact made with the resin sliding film RP, thereby resulting in a commensurate improvement in endurance.

Figure 11:
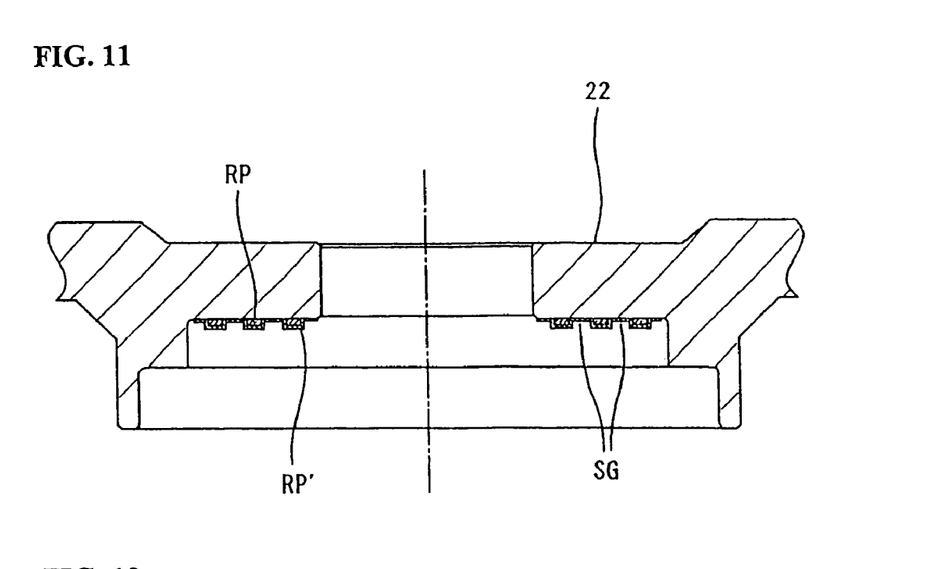
FIG. 11 is a vertical cross-sectional view illustrating in expanded form a rotating hub in yet another aspect of the present invention.

Additionally, in the embodiment shown in FIG. 11, the pad printing method similar to that described above is used to apply and form a resin sliding film RP' in the form of a thin-layer cover over the top of the resin sliding film RP as formed as shown in the embodiment of FIG. 9.

Figure 12:
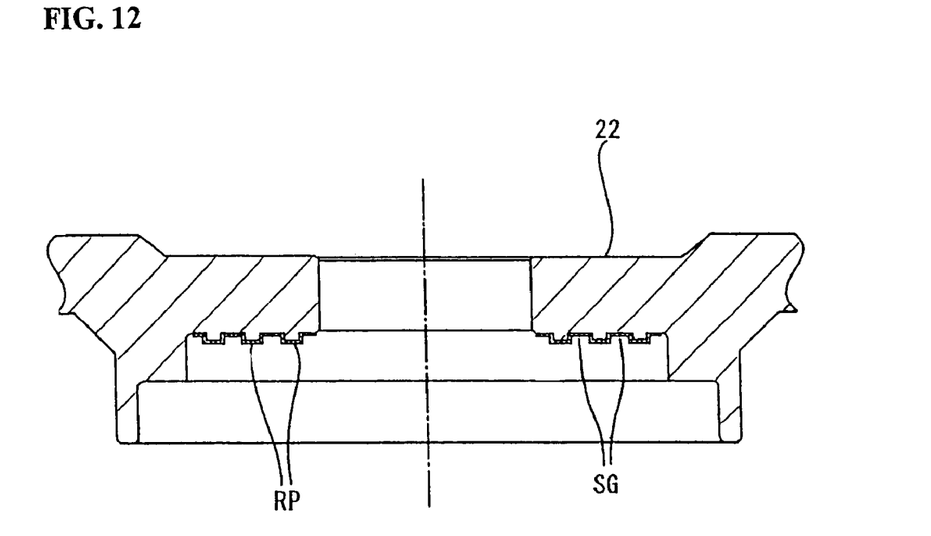
FIG. 12 is a vertical cross-sectional view providing an enlarged view of a rotating hub in yet another aspect of the present invention.

In the embodiment shown in FIG. 12, mechanical machining is done to the thrust fluid dynamic pressure-generating groove SG beforehand, after which pad printing is performed to apply and form a resin sliding film RP as a thin-layer cover over the thrust bearing fluid dynamic surface of the rotating hub 22. The operation and effect of this embodiment are the same as those described for the foregoing embodiments.

Figure 13:
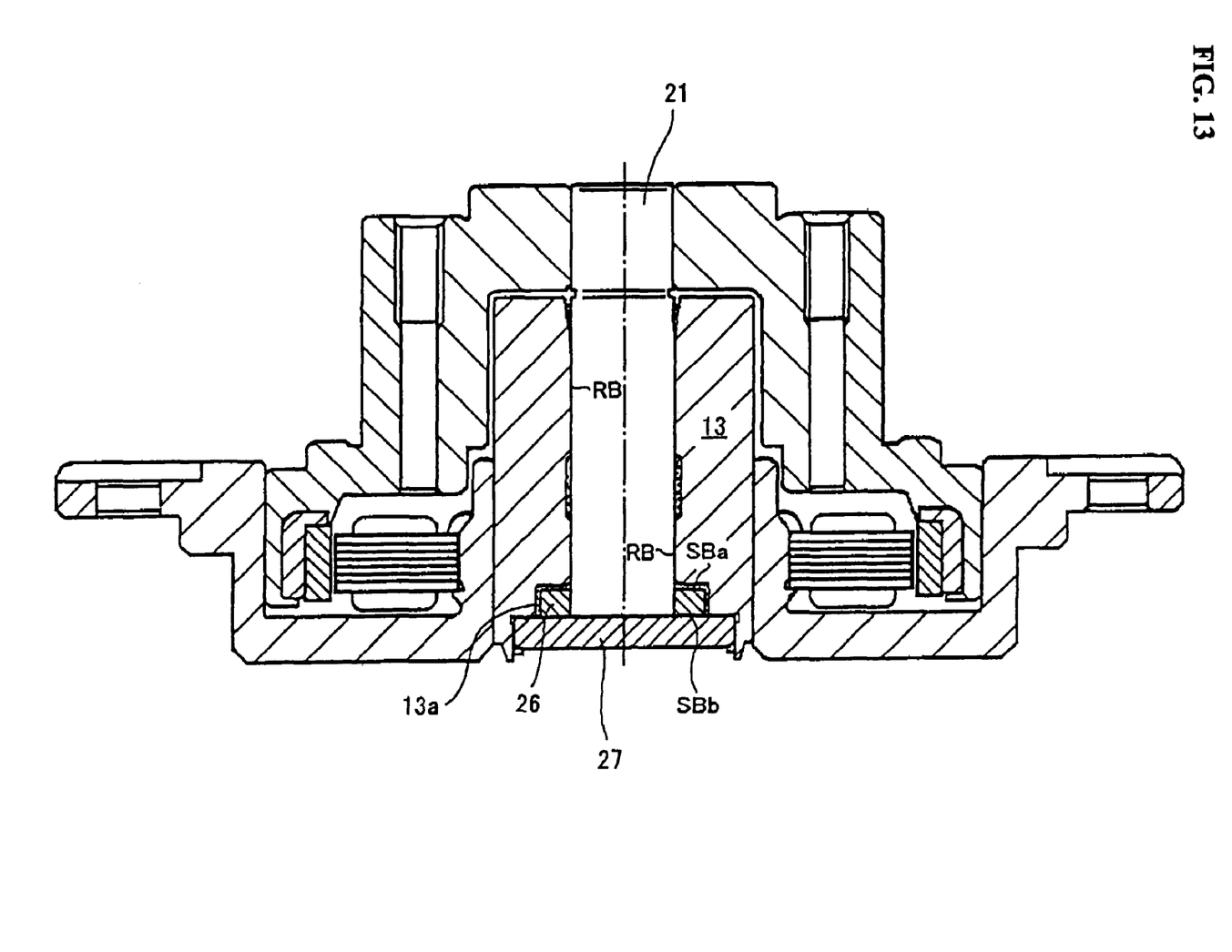
FIG. 13 is a cross-sectional view providing a general view of a spindle motor for spindle-type hard-disk drive having a fluid dynamic bearing to which yet another aspect of the present invention is applied.

In the embodiment shown in FIG. 13 elements that are the same as in the hard-disk drive shown in FIG. 1 are assigned the same reference numerals. In this hard-disk drive, a ring-shaped thrust plate 26 is fit over the end part of the rotational shaft 21. This thrust plate 26 is housed within a depression 13a formed in the bearing sleeve 13. An inside thrust fluid dynamic bearing part SBa is formed between the bottom surface of the depression 13a of the bearing sleeve 13 and the surface of the thrust plate 26.

A counterplate 27 is attached to the aperture part of the bearing sleeve 13 so as to be opposite the thrust plate 26. An outside thrust fluid dynamic bearing part SBb is formed between the surface of the counterplate 27 and the surface of the thrust plate 26.

In the same manner as described regarding the foregoing embodiments, a resin sliding film RP is formed on the thrust bearing fluid dynamic surfaces of the thrust fluid dynamic bearing parts SBa and SBb. The operation and the effect of this embodiment are the same as noted for the foregoing embodiments.

Figure 14:
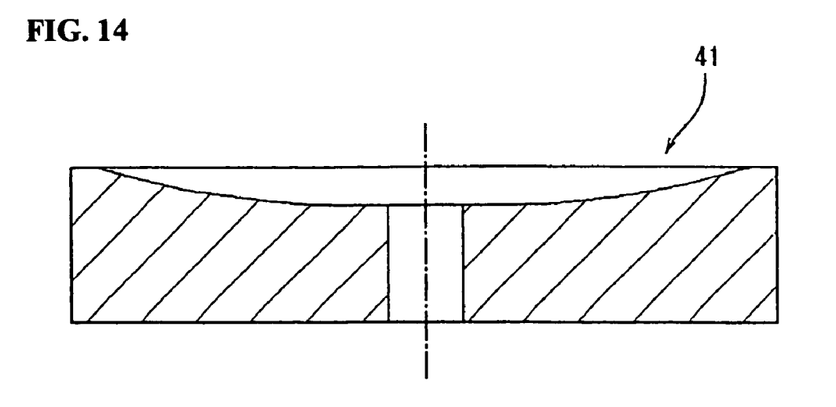
FIG. 14 is a vertical cross-sectional view illustrating the general construction of a spherical surface bearing apparatus according to another aspect of the present invention.
Figure 15:
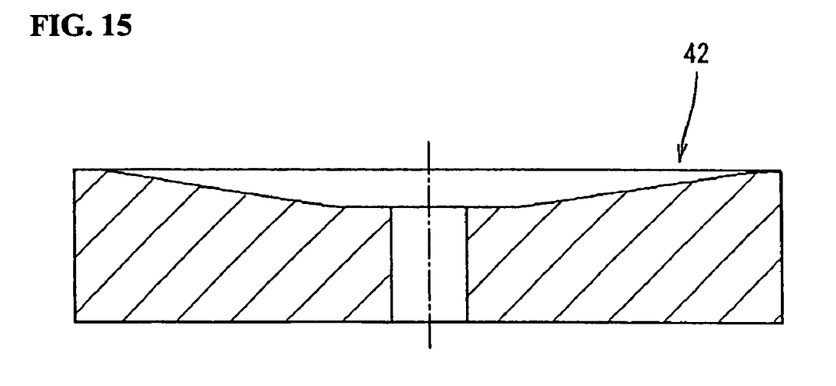
FIG. 15 is a vertical cross-sectional view showing the general construction of a conical surface bearing apparatus according to yet another aspect of the present invention.

The embodiment shown in FIG. 14 is the case of a spherical surface thrust bearing part 41. The embodiment shown in FIG. 15 is the case of a conical surface thrust bearing part 42. In case of either the spherical surface thrust bearing or the conical surface thrust bearing, a resin sliding film RP is formed as it is described with regard to the foregoing embodiment. The operation and the effect of these embodiments are the same as noted for the foregoing embodiments.

The foregoing has been a description of specific embodiments of the present invention as invented by the inventors. It will be understood that these embodiment are not restrictive, but rather exemplary, and that various other forms of the present invention are possible within the bounds of the spirit of the invention.

For example, whereas each of the above-described embodiments was for the case of application of the present invention to a thrust fluid dynamic bearing part, the present invention is not restricted in this manner. The present invention can be applied in the same manner to diverse bearing apparatuses other than a fluid dynamic bearing apparatus.

What is claimed is:

1. A method for manufacturing a bearing apparatus comprising:
   transfer-printing a resin sliding film onto at least one of opposing surfaces of a rotating member and a fixed member;
   using a soft pad onto which is affixed an ink-like resin material; and
   pressing the soft pad up against the at least one opposing surface to be printed onto,
   wherein a thrust-dynamic pressure groove pattern is formed by and at the time of transfer-printing the resin sliding film.

2. The method for manufacturing a bearing apparatus according to claim 1, further comprising:
   forming a depression part in a plate member corresponding to a thrust fluid dynamic surface onto which the resin sliding film is to be formed, causing an ink-like resin material to flow into the depression part of the plate member, and then removing unwanted ink-like resin material from the plate member;
   pressing a soft pad up against the plate member, so as to cause the ink-like resin material within the depression part of the plate member to become affixed to the soft pad; and
   pressing the soft pad onto which the ink-like resin material has been affixed up against at least one of the opposing thrust fluid dynamic surfaces of the rotating member and the fixed member, so that the ink-like resin material on the soft pad member side is transferred to that thrust fluid dynamic surface.

3. The method according to claim 1, further comprising forming a fluid dynamic thrust bearing part between opposing surfaces of the rotating member and the fixed member.

4. The method according to claim 1, wherein the thrust dynamic pressure-generating groove is formed as a depression at a location at which the resin sliding film is not formed.

5. The method according to claim 1, further comprising erecting an annular wall relative to an axis of rotation of the rotating member.

6. The method according to claim 1, wherein the thrust dynamic pressure-generating groove is spiral-shaped and is formed as a depression by removing part of the resin sliding film.

* * * * *